No. 659,744. Patented Oct. 16, 1900.
E. C. GUERRANT.
NUT AND BOLT LOCK.
(Application filed Feb. 5, 1900.)
(No Model.)

Witnesses
Inventor
Estill C. Guerrant

United States Patent Office.

ESTILL C. GUERRANT, OF MEMPHIS, TENNESSEE, ASSIGNOR OF ONE-FOURTH TO RICHARD P. WOODSON, OF SAME PLACE.

NUT AND BOLT LOCK.

SPECIFICATION forming part of Letters Patent No. 659,744, dated October 16, 1900.

Application filed February 5, 1900. Serial No. 4,026. (No model.)

*To all whom it may concern:*

Be it known that I, ESTILL C. GUERRANT, a citizen of the United States, residing at Memphis, in the county of Shelby and State of Tennessee, have invented certain new and useful Improvements in Nut and Bolt Locks; and I do hereby declare the following to be a full, clear, and exact description of the invention, such as will enable others skilled in the art to which it appertains to make and use the same.

This invention relates to means for preventing the relative turning of bolts and nuts after the latter have been screwed home. The locking means are located between the nut and bolt and are independent of the part or object bolted. Hence the nut can be secured at any position upon the bolt. In its structural organization the lock comprises a washer having retaining-points extending into the bolt-opening at diagonally-opposite points, said retaining-points being embedded into opposite sides of the bolt simultaneously with the action of screwing the nut home upon the bolt. Combined with the nut and washer is a second washer adapted to be clamped between the said parts and adapted to have portions bent against the edges of the nut and first-mentioned washer, so as to prevent turning of the nut when properly adjusted.

For a full description of the invention and the merits thereof and also to acquire a knowledge of the details of construction of the means for effecting the result reference is to be had to the following description and the drawings hereto attached.

While the essential and characteristic features of the invention are necessarily susceptible of modification, still the preferred embodiment of the invention is illustrated in the accompanying drawings, in which—

Figure 1:
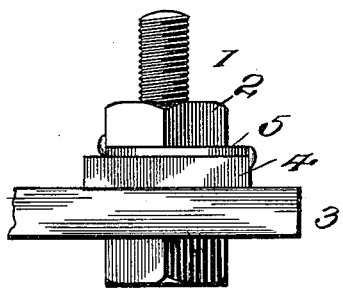
Figure 2:
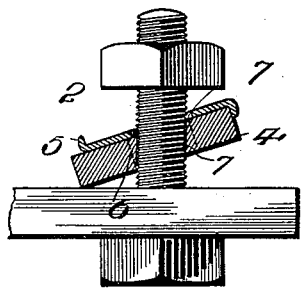
Figure 3:
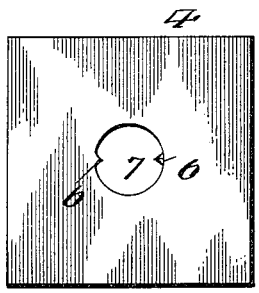
Figure 4:
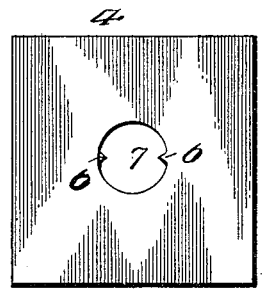
Figure 5:
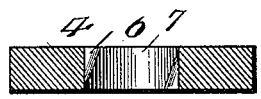

Figure 1 is a detail view showing the relative position of the parts after the nut has been screwed upon the bolt and made fast. Fig. 2 is a view similar to Fig. 1, showing the disposition of the parts prior to screwing the nut home, the washer having the locking-points being in section. Figs. 3 and 4 are top and bottom plan views, respectively, of the washer. Fig. 5 is a detail section of the washer.

Corresponding and like parts are referred to in the following description and indicated in all the views of the drawings by the same reference characters.

The bolt 1 is of ordinary formation and is provided at one end with a head and has its shank threaded to receive the nut 2, making screw-thread connection therewith, the object 3 to be bolted being clamped between the head of the bolt and the nut in the usual manner. The locking means consists, essentially, of washers 4 and 5, which for the sake of clearness and to avoid confusion will be designated, respectively, as the "anchoring" and "locking" washers. The washer 4 is thick and constitutes the anchoring member, whereas the washer 5 is thin and flexible and is the locking element. Rigid points or penetrating projections 6 extend into the bolt-opening 7 of the washer 4 at diagonally-opposite points and are adapted to bite into opposite sides of the bolt 1. To facilitate the entrance of the points 6 into the sides of the bolt, said points are of V form, the opposite sides being beveled to a penetrating edge, as most clearly indicated in Figs. 3 and 4. In order to give stability to the points 6, they extend from the top to the bottom side of the washer and taper throughout their length inversely, as shown most clearly in Figs. 2 and 5, at an oblique angle to the axis of the bolt-hole. As a result of the diagonal disposition of the points 6 the washer 4 when placed upon the bolt assumes an oblique or inclined position, as indicated in Fig. 2. The lower corner of the anchoring-washer obtains a purchase against the object 3, and the upper corner is engaged by the nut 2 and is gradually forced toward the adjacent side of the object 3 when screwing the nut 2 home. This operation gradually forces the points 6 into opposite sides of the bolt and prevents any turning of the washer thereon or the bolt within the washer.

The lock-washer 5 is placed between the anchoring-washer 4 and the nut 2 and is clamped between them, and after the nut 2 has been turned up tight upon the bolt opposite portions of the washer 5 are reversely bent to engage with, respectively, the edges of the anchoring-washer 4 and the nut 2, as indicated most clearly in Fig. 1, thereby fixing the position of the nut and preventing its loosening or casual displacement. When it is required to remove the nut from the bolt, the end of the lock-washer in engagement with the edge of the said nut is straightened and the nut removed in the ordinary manner. The anchoring-washer can be disengaged by forcing a cold-chisel or other implement between the washer 4 and the part 3 opposite the lowermost point 6, so as to clamp the washer into the position substantially as shown in Fig. 2, when it can be readily removed from the bolt and the parts used again in the manner stated.

Having thus described the invention, what is claimed as new, and desired to be secured by Letters Patent, is—

1. In a nut and bolt lock, a washer, having rigid points or biting projections arranged in the bolt-opening at diagonally-opposite points and tapering inversely throughout their length at an oblique angle to the axis of said bolt-opening and having their sides beveled to a penetrating edge, said points being adapted to be forced into opposite sides of the bolt upon forcing the washer from an oblique to a right-angular position thereon simultaneously with the screwing home of the nut, substantially as described.

2. In combination with a bolt, and coöperating nut, an anchoring-washer having rigid points or biting projections arranged in the bolt-opening at diagonally-opposite points and tapering inversely throughout their length at an oblique angle to the axis of said bolt-opening and having their sides beveled to a penetrating edge, said points being adapted to be forced into opposite sides of the bolt upon forcing the washer from an oblique to a right-angular position thereon simultaneously with the screwing home of the nut, and a lock-washer adapted to be clamped between the anchoring-washer and nut and adapted to have portions reversely bent to engage with, respectively, the anchoring-washer and nut, substantially as described.

In testimony whereof I affix my signature in presence of two witnesses.

ESTILL C. GUERRANT. [L. S.]

Witnesses:
PETER BRICKEY,
L. ROBINSON.